United States Patent
Green et al.

(10) Patent No.: US 12,441,379 B2
(45) Date of Patent: Oct. 14, 2025

(54) CONTROLLER, SYSTEM AND METHOD FOR VEHICLE CONTROL

(71) Applicant: Hitachi Rail GTS Canada Inc., Toronto (CA)

(72) Inventors: Alon Green, Toronto (CA); Dennis Yazhemsky, Toronto (CA); Shahin Sirouspour, Hamilton (CA)

(73) Assignee: Hitachi Rail GTS Canada Inc., Toronto (CA)

( * ) Notice: Subject to any disclaimer, the term of this patent is extended or adjusted under 35 U.S.C. 154(b) by 798 days.

(21) Appl. No.: 16/436,440

(22) Filed: Jun. 10, 2019

(65) Prior Publication Data

US 2019/0375441 A1     Dec. 12, 2019

Related U.S. Application Data (60) Provisional application No. 62/682,537, filed on Jun. 8, 2018.

(51) Int. Cl.
| | |
|---|---|
| *B61L 27/20* | (2022.01) |
| *B61L 25/02* | (2006.01) |
| *G05B 13/04* | (2006.01) |

(52) U.S. Cl.
CPC ............. *B61L 27/20* (2022.01); *B61L 25/021* (2013.01); *G05B 13/042* (2013.01)

(58) Field of Classification Search
CPC ............... B61L 27/0038; B61L 25/021; B61L 15/0072; B61L 3/006; B61L 25/025; G05B 13/042
USPC .......................................................... 701/20
See application file for complete search history.

(56) References Cited

U.S. PATENT DOCUMENTS

| | | | |
|---|---|---|---|
| 5,615,116 A | * | 3/1997 | Gudat .................... G08G 1/202 |
| | | | 701/23 |
| 6,085,147 A | | 7/2000 | Myers |
| 6,654,681 B1 | | 11/2003 | Kiendl et al. |
| 8,352,112 B2 | | 1/2013 | Mudalige |
| (Continued) | | | |

FOREIGN PATENT DOCUMENTS

| | | |
|---|---|---|
| JP | 200029518 A | 7/2001 |
| JP | 2000029518 A * | 9/2003 |
| WO | WO2014006327 A1 | 1/2014 |

OTHER PUBLICATIONS

Murgovski et al., Nikolce, "predictieve cruise control with automous overtaking," pp. 1-6, 2015.*

(Continued)

*Primary Examiner* — Angela Y Ortiz
*Assistant Examiner* — Laura E Linhardt
(74) *Attorney, Agent, or Firm* — Studebaker Brackett PLLC (57) ABSTRACT

A controller for a vehicle includes a processor configured to repeatedly perform operations, at each control iteration among a plurality of control iterations along a path of the vehicle from a start location to a target location. The operations include, based on a current state of the vehicle, generating a travel plan for a remainder of the path from a current position of the vehicle to the target location, by solving an optimization problem. The operations further include controlling a motoring and braking system of the vehicle to execute the generated travel plan until a next control iteration among the plurality of control iterations.

20 Claims, 7 Drawing Sheets

(56) References Cited

U.S. PATENT DOCUMENTS

| | | | |
|---|---|---|---|
| 9,499,183 | B2 | 11/2016 | Di Cairano et al. |
| 9,535,422 | B2 | 1/2017 | Minoiu-Enache |
| 10,124,784 | B2 | 11/2018 | D'Amato et al. |
| 10,209,685 | B2 | 2/2019 | Kniazev et al. |
| 10,235,818 | B2 | 3/2019 | Wang et al. |
| 11,747,827 | B2 * | 9/2023 | Xu ................. G08G 1/0112 701/482 |
| 2008/0059007 | A1 | 3/2008 | Whittaker |
| 2016/0244077 | A1 | 8/2016 | Di Cairano et al. |
| 2017/0139423 | A1 | 5/2017 | El Ferik et al. |
| 2017/0282942 | A1 | 10/2017 | Mathews, Jr. et al. |
| 2018/0037243 | A1 | 2/2018 | Danielson et al. |
| 2018/0164822 | A1 | 6/2018 | Chu et al. |
| 2018/0259972 | A1 | 9/2018 | Heo et al. |

OTHER PUBLICATIONS

Giernacki, W. et al., "Real-Time Model-Free Minimum-Seeking Autotuning Method for Unmanned Aerial Vehicle Controllers Based on Fibonacci-Search Algorithm," Sensors, 19, 312, pp. 1-30, 2019, doi:10.3390/s19020312.

Albrecht, P. et al., "The key principles of optimal train control—part 1: Formulation of the model, strategies of optimal type, evolutionary lines, location of optimal switching points," Transportation Research Part B: Methodological, vol. 94, pp. 482-508, 2016, ISSN : 0191-2615.

Murgovski, N. et al., "Convex modeling of conflict resolution at traffic intersections," 2015 IEEE 54th Annual Conference on Decision and Control (CDC), 00. 4708-4713, Dec. 15-18, 2015, Osaka, Japan.

Oh, B. et al., "Genetic Algorithm-based Dynamic Vehicle Route Search using Car-to-Car Communication," Advances in Electrical and Computer Engineering, vol. 10, No. 4, pp. 81-86, 2010.

Pillac, V. et al., "A Review of Dynamic Vehicle Routing Problems," European Journal of Operational Research, Elsevier, 2013, 225(1), pp. 1-36, Sep. 2012.

International Search Report and Written Opinion issued in corresponding International Application No. PCT/IB2019/054830, mailed Sep. 25, 2019, Canadian Intellectual Property Office, Quebec, Canada.

Murgovski, N. et al., "Predictive cruise control with autonomous overtaking," 2015 54th IEEE Conference On Decision And Control (CDC), IEEE, Dec. 15, 2015, pp. 644-649.

European Search Report issued in corresponding European Application No. 19847526.1, mailed Feb. 18, 2022, pp. 1-10, European Patent Office, Munich, Germany.

Murgovski et al., Nikolce, "Convex modeling of conflict resolution at traffic intersections," 2015 54th IEEE conference on decision and control (CDC) Dec. 15, 2015 (pp. 4708-4713).

Korean First Office Action issued in corresponding Korean Application No. 10-2020-7037413, mailed Sep. 1, 2022, pp. 1-15, Korean Intellectual Property Office, Daejeon, Republic of Korea.

Murgovski et al., Nikolce, "Predictive cruise control with autonomous overtaking," pp. 1-6, 2015.

* cited by examiner

CONTROLLER, SYSTEM AND METHOD FOR VEHICLE CONTROL

PRIORITY CLAIM

The present application claims the priority benefit of U.S. Provisional Patent Application No. 62/682,537, filed Jun. 8, 2018, the entirety of which is hereby incorporated by reference.

BACKGROUND

Commuter train networks represent a rapidly growing industry. This rapid growth of rail commuter transit is accompanied by development of Automatic Train Operation (ATO) systems. Overall objectives of these systems are to reduce energy consumption and overall vehicle CO2 emission, improve timetable adherence, lessen wear-and-tear on train drive trains, ensure safe and robust system failure detection and fast subsequent response, and minimize the energy expenditure for a given trip.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry various features may not be drawn to scale and are used for illustration purposes only. In fact, the dimensions of the various features in the drawings may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation or position of a first feature over or on a second feature in the description that follows may include embodiments in which the first and second features are formed or positioned in direct contact, and may also include embodiments in which additional features may be formed or positioned between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of an apparatus, object in use or operation, or objects scanned in a three dimensional space, in addition to the orientation thereof depicted in the figures. The apparatus may be otherwise oriented (rotated 90 degrees or at other orientations) and the spatially relative descriptors used herein may likewise be interpreted accordingly.

In some embodiments, a guideway is a track, rail, roadway, cable, series of reflectors, series of signs, a visible or invisible path, a projected path, a laser-guided path, a global positioning system (GPS)-directed path, an object-studded path or other suitable format of guide, path, track, road or the like on which, over which, below which, beside which, or along which a vehicle is caused to travel. In some embodiments, a vehicle is a railway vehicle (such as, a train) or a road vehicle.

In some embodiments, a controller, such as a vehicle on-board controller (VOBC), is configured to control movement of a vehicle along a path from a start location to a target location. For this purpose, at each node along the path, a control problem of the vehicle is solved over the remainder of the trip, and the solution, such as a driving profile, is applied to drive the vehicle to the next node. The process is repeated until the target location is reached. In at least one embodiment, the control problem is a convex second order cone problem. In one or more embodiments, a first driving profile of a leading vehicle is sent to a trailing vehicle to enable a controller of the trailing vehicle to generate a second driving profile for controlling the trailing vehicle to follow the leading vehicle. Advantages in accordance with some embodiments include, but are not limited to, global optimality, robustness of the solution, and enforcement of a safety buffer between vehicles (e.g., trains) following each other on the same path (e.g., same track).

In some embodiments, the VOBC is implemented by running a background process on every vital machine having safety integrity level 4 (SIL 4) in the system which listens to communication traffic and collects key data as identified by a configuration profile of the VOBC. In some embodiments, SIL 4 is based on International Electrotechnical Commission's (IEC) standard IEC 61508. SIL level 4 means the probability of failure per hour ranges from $10^{-8}$ to $10^{-9}$.

Figure 1:
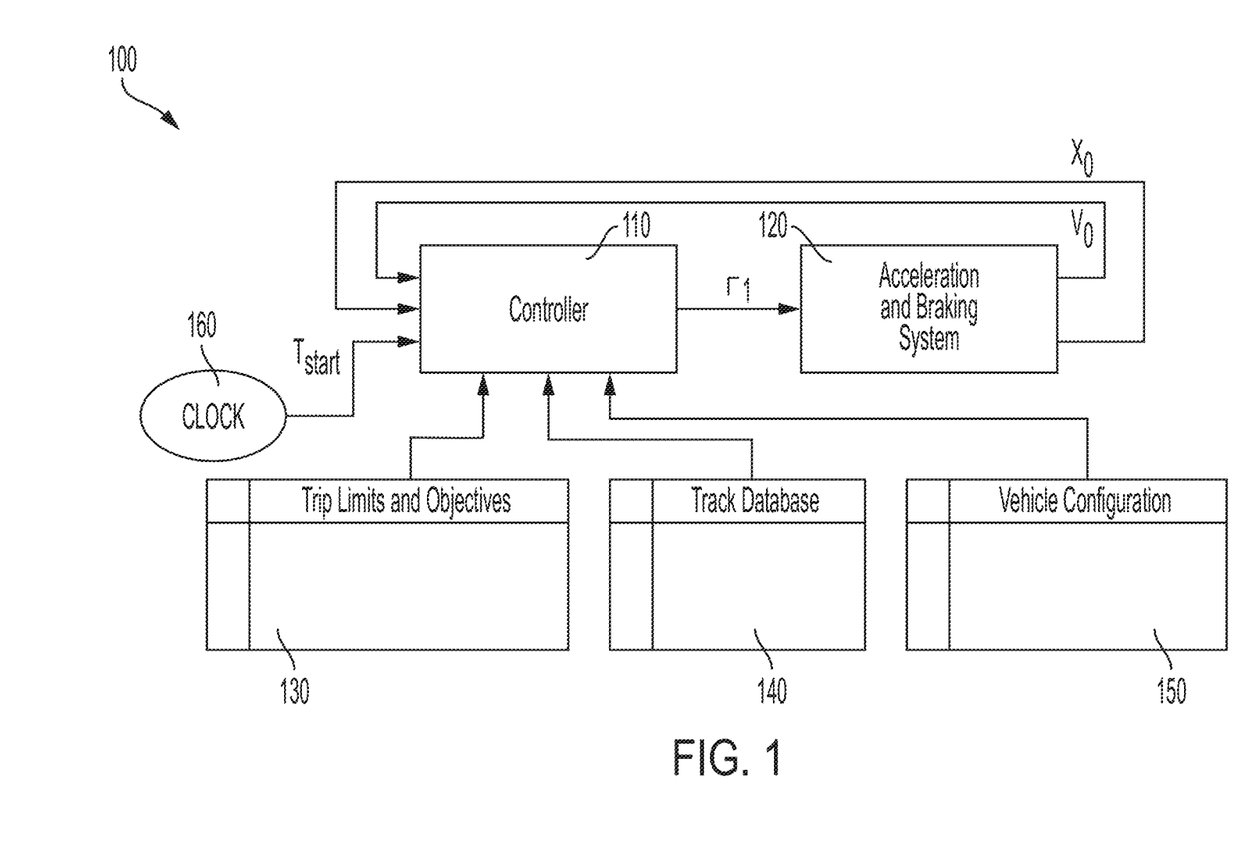
FIG. 1 is a diagram of a motion controlling part of a vehicle, in accordance with one or more embodiments.

FIG. 1 is a diagram of a motion controlling part of a vehicle 100, in accordance with one or more embodiments. The motion controlling part of the vehicle 100 includes a controller 110 and a motoring and braking system 120. In some embodiments, the controller 110 comprises at least one processor or computing platform as described with respect to FIG. 8. In at least one embodiment, the controller 110 is implemented as part of a VOBC (not shown) of the vehicle 100. For example, the controller 110 is implemented at least in part by a processor of the VOBC which is programmed to perform operations or functionality of the controller 110 described herein. In at least one embodiment, the controller 110 is implemented in hardware separate from the VOBC of the vehicle 100. For example, the controller 110 is implemented at least in part by a processor outside the VOBC and programmed to perform operations or functionality of the controller 110 described herein. The motoring and braking system 120 includes a propulsion source configured to generate a force or acceleration to move the vehicle along a path. Examples of a propulsion source include, but are not limited to, an engine or an electric motor. The motoring and braking system 120 further comprises a break for decelerating and stopping the vehicle 100. Other movements of the vehicle 100 are also effected by the motoring and braking system 120 in various embodiments. For example, in embodiments where steering of the vehicle 100 (e.g., a road vehicle) is possible, the motoring and braking system 120 also includes a steering mechanism for steering the vehicle 100.

In some embodiments, the controller 110 is configured to apply an optimal control technique to drive the vehicle 100. In at least one embodiment, optimal control involves treating a control problem as a model-based optimization problem where the control law is computed through optimizing a given objective for a known process model (the model of the system, e.g., a vehicle, being controlled) under the presence of one or more constraints. For this purpose, the controller 110, also referred to as an optimal controller in one or more embodiments, is configured to solve an optimization problem based on a current state of the vehicle 100, at least one control objective, and at least one constraint.

In the example configuration in FIG. 1, the current state of the vehicle 100 includes a current speed (or velocity) $V_0$ of the vehicle 100, and a current position $X_0$ of the vehicle 100 on the path. In at least one embodiment, the current speed of the vehicle 100 is acquired by a speed sensor (not shown) in the motoring and braking system 120 or by an independent speed determination system using Doppler radar, camera (video odometry) and/or Light Detection And Ranging (LiDAR) equipment. The current position $X_0$ of the vehicle 100 is acquired, in one or more embodiments, by a sensor (not shown), such as a camera, a radar, a LiDAR scanner, or a radio frequency (RF) transceiver, that reads corresponding visible, radar, LiDAR or RF data embedded in a sign arranged along the path, in an arrangement known as a communication based train control (CBTC) system. Other configurations where the current state of the vehicle 100 include other operational parameters of the vehicle 100 and/or how such operational parameters are acquired are within the scopes of various embodiments. For example, in at least one embodiment, the current state of the vehicle 100 includes a current acceleration of the vehicle 100 acquired by an acceleration sensor of the vehicle 100.

In the example configuration in FIG. 1, at least one control objective and at least one constraint to be used by the controller 110 in formulating and/or solving the optimization problem are included in a trip limits and objectives database 130, a track database 140, and a vehicle configuration database 150. One or more of the trip limits and objectives database 130, track database 140 and vehicle configuration database 150 is/are contained in a computer readable storage medium for access by the controller 110 or a processor thereof, as described with respect to FIG. 8.

At least one control objective is included in the trip limits and objectives database 130. Examples of at least one control objective include, but are not limited to, minimum amount of time to drive the vehicle from a start location to a target location on the path, minimum amount of energy consumption to drive the vehicle from the start location to the target location, and minimum excessive braking along the path. In at least one embodiment, the controller 110 is configured to solve the optimization problem with a mixed control objective, for example, a mixed time and energy objective. In this situation, the trip limits and objectives database 130 includes corresponding time and energy weights for the mixed time and energy objective. A further example includes a mixed objective of time, energy and excessive braking with three corresponding weights. In some embodiments, the controller 110 is configured to change or adjust, in real-time while the vehicle is travelling on the path, the control objective. In an example, the controller 110 changes the control objective from time to energy, or from time or energy to a mixed time and energy objective. In another example, the controller 110 adjusts time and/or energy weights in a mixed time and energy objective to adapt the motion of the vehicle to new requirements from the system or a user. Other configurations for selecting and/or updating the control objective(s) are within the scopes of various embodiments.

Constraints in the optimization problem include one or more trip constraints, track constraints, and vehicle constraints. Trip constraints are limits related to the trip of the vehicle 100 along the path, and are included in the trip limits and objectives database 130. Examples of trip constraints include, but are not limited to, maximum and minimum arrival times at a location on the path, and constraints on braking. Track constraints are limits related to the path along which the vehicle 100 travels, and are included in the track database 140. Examples of track constraints include, but are not limited to, maximum allowable speed limit, friction, traction or grade profile of the path. Vehicle constraints are limits related to the vehicle 100 and are included in the vehicle configuration database 150. In at least one embodiment, vehicle constraints are parameters of a model of the vehicle 100 to be used by the controller 110 in the optimization problem. Examples of vehicle constraints include, but are not limited to, maximum braking force, maximum acceleration (or propulsion) force, vehicle mass, latencies/delays in the motoring and braking systems. Like the control objective, one or more constraints is/are changeable and/or adjustable by the controller 110 in real-time while the vehicle is travelling on the path. Other configurations for selecting and/or updating one or more constraints are within the scopes of various embodiments.

The controller 110 is configured to solve the optimization problem, using the current state from the motoring and braking system 120 and/or at least one sensor, at least one control objective with any applicable corresponding weight from the trip limits and objectives database 130, and one or more constraints from the trip limits and objectives database 130, track database 140 and vehicle configuration database 150. A solution for optimal control can be feasible or optimal. A feasible solution is one which satisfies the given constraints, for example, driving a vehicle from one location to another without over speeding. In some situations, there are various possible ways, i.e., various feasible solutions, to a control problem. An optimal solution is not only implicitly feasible but is the best feasible solution among the available feasible solutions. An optimal solution is achieved via minimizing or maximizing a control objective, for example, driving a vehicle from one location to another, without over speeding, in a minimum amount of time. This allows the number of feasible (possible) solutions to the control problem to be reduced from a large amount to a single high quality result. In some embodiments, the controller solved an optimization problem when an optimal solution has been achieved.

In some embodiments, optimization models are configured with an aim to guarantee feasibility and optimality of the resultant solution. This is achievable by presenting the optimal control law in a convex representation which guarantee that both feasible and optimal solutions are attainable for a feasible set of constraints. In addition, convex optimization problems are solvable far quicker and more efficiently than non-convex optimization problems. Nevertheless, in at least one embodiment, the optimization problem to be solved by the controller 110 is a non-convex optimization problem. In at least one embodiment, the optimization problem is a convex optimization problem. In at least one embodiment, the convex optimization problem is a convex second order cone problem. Due to the mathematical nature of the convex second order cone problem, it is possible to determine if the control problem is infeasible (e.g., arrival time, speed limit, or stopping point are impossible to achieve) in a fraction of the time it takes to solve one control iteration. Further, if the control problem is determined to be feasible, the solution is guaranteed to be optimal. Examples of one or more non-convex optimization problems, convex optimization problems and convex second order cone problems, and their corresponding solutions, are described in U.S. Provisional Patent Application No. 62/682,537, filed Jun. 8, 2018, the entirety of which is hereby incorporated by reference.

In the example configuration in FIG. 1, the controller 110 is configured to solve the optimization problem in the time domain, in accordance with a clock signal from an internal clock circuit 160. For example, the controller 110 is configured to solve the optimization problem at every control cycle dictated by the clock signal from the clock circuit 160. In at least one embodiment, each control cycle is 100 ms or shorter. As a result, the optimization problem is solved multiple times at a plurality of discretization nodes along the path. Adjacent discretization nodes are arranged at a predetermined time interval corresponding to the clock signal. Physical distances between adjacent discretization nodes are, however, not necessarily equal due to non-linearities of various factors and/or parameters. In some situations, such non-linearities present one or more concerns when attempting to solve optimization problems in the time domain.

In another example configuration, the controller 110 is configured to solve the optimization problem in the position domain. For example, the controller 110 is configured to solve the optimization problem at every discretization node among a plurality of discretization nodes arranged at a predetermined distance along the path. Adjacent discretization nodes are therefore equally spaced. In some situations, discretization of the path and solving optimization problems in the position domain address one or more concerns met when attempting to solve optimization problems in the time domain.

Figure 2:
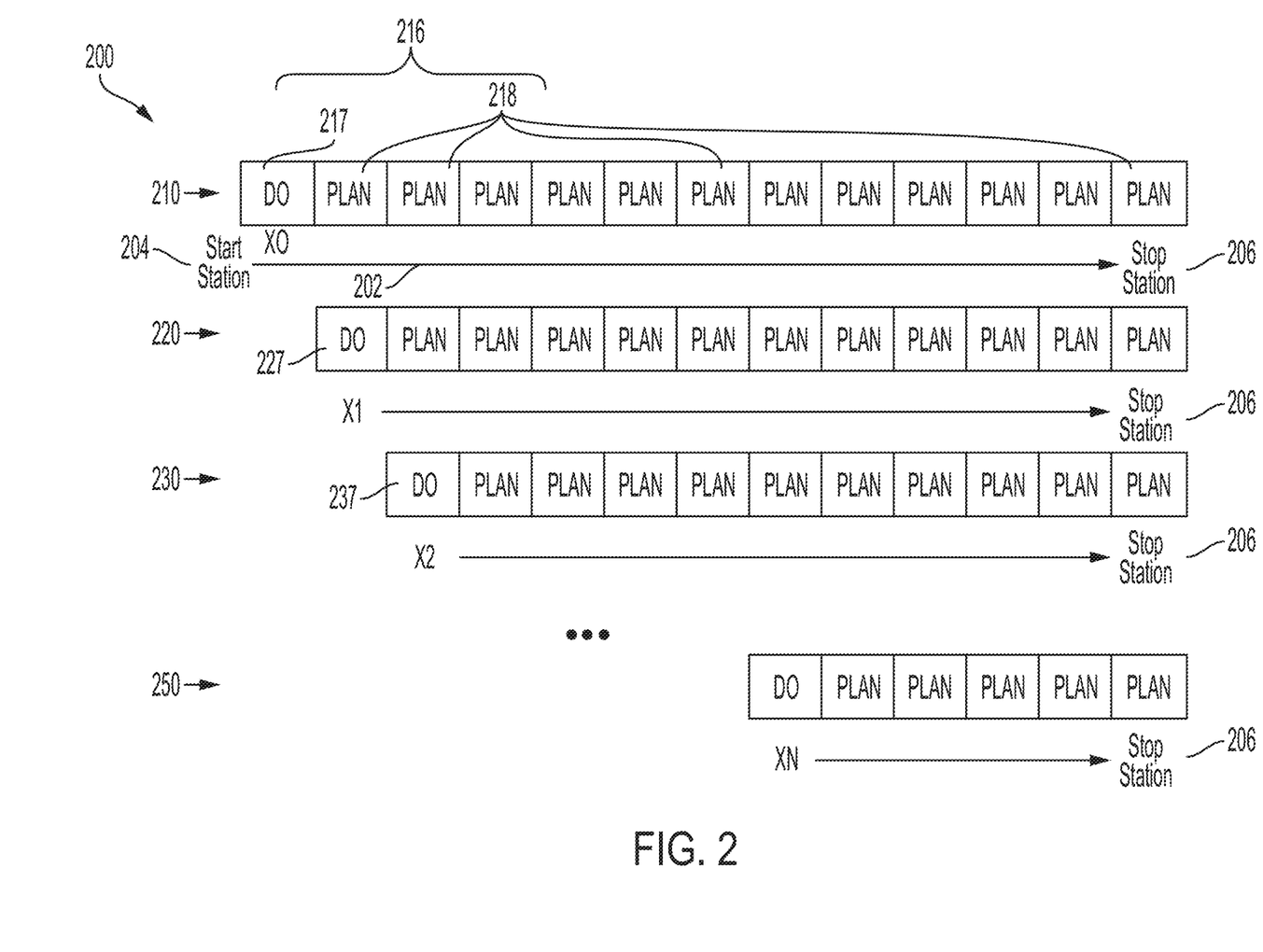
FIG. 2 is a diagram of operations of the motion controlling part of FIG. 1, in accordance with one or more embodiments.

FIG. 2 is a diagram of operations 200 of the motion controlling part in FIG. 1, in accordance with one or more embodiments. The operations 200 include a plurality of control iterations 210, 220, 230, . . . 250 along a path 202 of the vehicle from a start location 204 to a target location 206. In the example configuration in FIG. 2, the path 202 is a track or rail on which the vehicle which is a train travels, the start location 204 is a start station, and the target location 206 is a stop station. However, other configurations are within the scopes of various embodiments. For example, in at least one embodiment, the start location 204 and/or the target location 206 is/are locations on the path 202 between which optimization of the travel of the vehicle is to be performed. The speed of the vehicle at the start location 204 and/or the target location 206 is not necessarily zero, i.e., the vehicle does not necessarily start or end its travel at the start location 204 or target location 206. The control iterations 210, 220, 230, . . . 250 are performed in the time domain or the position domain as described herein. In the time domain, the control iterations 210, 220, 230, . . . 250 correspond to various discretization nodes arranged at a predetermined time interval corresponding to the clock signal (control cycle) of the clock circuit 160. In the position domain, the control iterations 210, 220, 230, . . . 250 correspond to various discretization nodes distributed at a predetermined distance along the path 202.

At each of the control iterations 210, 220, 230, . . . 250, the controller 110 is configured to, based on a current state of the vehicle, generate a travel plan for a remainder of the path 202 from a current position of the vehicle to the target location 206. For example, at the first control iteration 210 at the start location 204, the current state of the vehicle includes the current speed $V_0$ and the current position $X_0$ as described with respect to FIG. 1. Based on this current state, the controller 110 is configured to perform an optimization problem to achieve at least one control objective under one or more constraints, as described with respect to FIG. 1. The solution of the optimization problem includes at least one driving profile 216 which includes for each of discretization nodes 217, 218 on a remainder of the path 202 between the current position, i.e., the start location 204, and the target location 206, at least one of time, position, speed or acceleration of the vehicle. At the first control iteration 210, because the current position of the vehicle is the start location 204, the remainder of the path 202 is the path 202 itself. The time, position, speed or acceleration of the vehicle at each of the discretization nodes 217, 218 in accordance with the driving profile 216 is optimal to achieve the at least one control objective under the one or more constraints of the optimization problem. For example, when the optimization problem is performed in the time domain, the driving profile 216 includes a position profile including an optimal position of the vehicle at each discretization node (i.e., at each control cycle). In another example, when the optimization problem is performed in the position domain, the driving profile 216 includes a time profile including an optimal time when the vehicle arrives at each discretization node. In a further example, the driving profile 216 includes a speed or acceleration profile including an optimal speed or acceleration of the vehicle at each discretization node. One or more of the driving profile 216, e.g., a position profile, a speed profile and an acceleration profile, together define a travel plan for the vehicle over the remainder of the path 202. Other driving profiles besides the described time profile, position profile, speed profile and acceleration profile are within the scopes of various embodiments.

The controller 110 is further configured to control the motoring and braking system 120 of the vehicle to execute the travel plan until a next control iteration. For example, the first element of the driving profile 216, i.e., at least one of time, position, speed or acceleration of the vehicle, at the first discretization node 217 corresponding to the start location 204 is applied, in the form of a control vector $\Gamma_1$ in FIG. 1, by the controller 110 to control the motoring and braking system 120. At least one embodiment, the control vector represents an input force command to cause the motoring and braking system 120 to generate a propulsion or braking force to achieve the optimal time, position, speed or acceleration in the first element of the driving profile 216. The motoring and braking system 120 maintains the propulsion or braking force until the next control iteration 220

(or next discretization node 227) is reached, at which time the controller 110 is configured to solve the optimization problem again.

Specifically, at the second control iteration 220, the new current state of the vehicle includes a new current speed and a new current position $X_1$. The remainder of the path 202 is shortened, and includes a section between the new current position $X_1$ and the target location 206. The controller 110 is configured to perform the optimization problem again, based on the new current state and any update/adjustment to the control objective and/or constraints. The solution is a new driving profile for the remainder of the path 202 between the new current position $X_1$ and the target location 206. The first element of the new driving profile at the discretization node 227 is applied by the controller 110 to control the motoring and braking system 120 to move the vehicle until the next control iteration 230 (or next discretization node 237) is reached, at which time the controller 110 is configured to solve the optimization problem again.

Specifically, at the third control iteration 230, the current state of the vehicle is updated. The remainder of the path 202 is shortened, and includes a section between the new current position $X_2$ and the target location 206. The controller 110 is configured to perform the optimization problem again, based on the updated current state and any update/adjustment to the control objective and/or constraints. The solution is a further driving profile for the remainder of the path 202 between the new current position $X_2$ and the target location 206. The first element of the further driving profile at the discretization node 237 is applied by the controller 110 to control the motoring and braking system 120 to move the vehicle until the next control iteration (or next discretization node) is reached, at which time the controller 110 is configured to solve the optimization problem again. The above-described operations are repeatedly performed until the vehicle reaches the target location 206. As a result, in at least one embodiment, an optimal travel of the vehicle at every discretization node along the path 202 is achievable, while taking into consideration various changes or adjustments in the control objective (e.g., from time to energy), trip constraints (e.g., updated maximum or minimum arrival time), track constraints (e.g., updated speed limit), and/or vehicle constraints (e.g., changed vehicle mass due to passengers getting on or off the vehicle).

Figure 3:
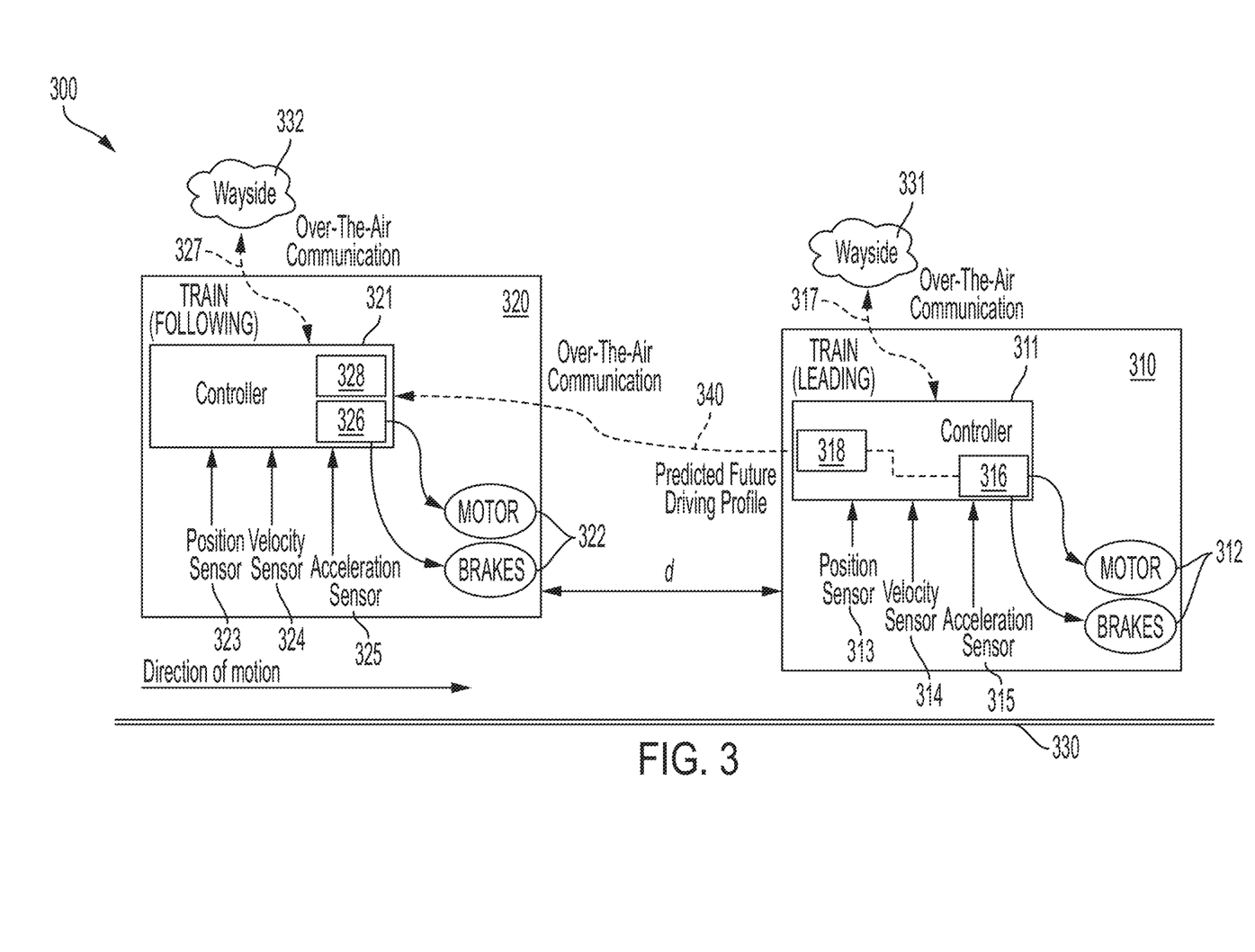
FIG. 3 is a diagram of a system, in accordance with one or more embodiments.

FIG. 3 is a diagram of a system 300, in accordance with one or more embodiments. The system 300 is configured to control a plurality of vehicles 310, 320, one following another along a common path 330. As shown by the direction of motion arrow in FIG. 3, the vehicle 310 is a leading vehicle and the vehicle 320 is a trailing or following vehicle that follows the leading vehicle 310 on path 330. The leading vehicle 310 comprises a first controller 311, a motoring and braking system 312, a position sensor 313, a velocity (or speed) sensor 314, and an acceleration sensor 315. The trailing vehicle 320 comprises a second controller 321, a motoring and braking system 322, a position sensor 323, a velocity (or speed) sensor 324, and an acceleration sensor 325. In at least one embodiment, at least one of the first controller 311 and second controller 321 corresponds to the controller 110, at least one of the motoring and braking system 312 and motoring and braking system 322 corresponds to the motoring and braking system 120, and at least one of the position sensor 313, velocity sensor 314, acceleration sensor 315, position sensor 323, velocity sensor 324, acceleration sensor 325 corresponds to a respective sensor described with respect to FIG. 1. The first controller 311 communicates over a communication 317 with a wayside sign 331 arranged along the path 330, using a sensor (not shown), such as a camera, a radar, a LiDAR scanner, or an RF transceiver, in an CBTC arrangement as described herein the second controller 321 communicates over a communication 327 with a wayside sign 332 arranged along the path 330, using a sensor (not shown), such as a camera, a radar, a LiDAR scanner, or an RF transceiver, in an CBTC arrangement as described herein.

The first controller 311 comprises a first communication circuit 318, and the second controller 321 comprises a second communication circuit 328. The first communication circuit 318 and the second communication circuit 328 are configured to perform communication 340 with each other to transmit a first driving profile 316 from the first controller 311 to the second controller 321 as described herein. In at least one embodiment, the communication 340 is a one-way communication to reduce the workload and/or circuit complexity. In the example configuration in FIG. 3, the communication 340 is an over-the-air communication, for example, an RF channel, and the first communication circuit 318 and second communication circuit 328 comprise corresponding RF transmitting and receiving circuits and/or antennas, respectively. Other configurations of the communication 340 are within the scopes of various embodiments. For example, the communication 340 is a two-way communication in at least one embodiment.

The first controller 311 associated with the leading vehicle 310 is configured to generate the first driving profile 316, and control movement of the leading vehicle 310 along the path 330 based on the generated first driving profile 316. In at least one embodiment, the first controller 311 is configured to generate the first driving profile 316 by solving an optimization problem using the current state of the leading vehicle 310 acquired from at least one of the position sensor 313, velocity sensor 314, acceleration sensor 315, with respect to at least one control objective and one or more constraints as described with respect to FIGS. 1-2. Other configurations are within the scopes of various embodiments. For example, the first driving profile 316 is generated in a manner different than solving an optimization problem, e.g., the first driving profile 316 is estimated or generated by another ATO technique. In at least one embodiment, the first controller 311 is configured to apply the first driving profile 316 to control the motoring and braking system 312 to drive the leading vehicle 310, as described with respect to FIGS. 1-2.

The second controller 321 associated with the trailing vehicle 320 is configured to receive the first driving profile 316 generated by the first controller 311 over the communication 340. The second controller 321 is further configured to generate a second driving profile 326 based on the received first driving profile 316, and control movement of the trailing vehicle 320 along the path 330 and following the leading vehicle 310 based on the generated second driving profile 326. In at least one embodiment, the second controller 321 is configured to generate the second driving profile 326 by solving an optimization problem using the current state of the trailing vehicle 320 acquired from at least one of the position sensor 323, velocity sensor 324, acceleration sensor 325, with respect to at least one control objective and one or more constraints as described with respect to FIGS. 1-2. However, in addition to the one or more constraints described with respect to the trip limits and objectives database 130, track database 140 and vehicle configuration database 150, the second controller 321 solve the optimization problem using the first driving profile 316 as an additional constraint. Specifically, the first driving profile 316 includes information on a position of the leading vehicle 310 at a given time. The additional constraint used by the second controller 321 in solving the optimization problem ensures that the trailing vehicle 320 is at least a distance d away from the position of the leading vehicle 310 at the given time.

In at least one embodiment, at each control iteration, the second controller 321 receives the first driving profile 316 and uses the first driving profile 316 as a constraint to generate the second driving profile 326 through solving an optimization problem. In at least one embodiment, at each control iteration, the first controller 311 generates the first driving profile 316 through solving an optimization problem, and sends the first driving profile 316 to the second controller 321. In some embodiments, the optimization problems solved by the first controller 311 and the second controller 321 differ in at least one control objective and/or one or more constraints. For example, a control objective of the first controller 311 is time, whereas a control objective of the second controller 321 is a mixed time and energy objective. Examples of optimization problems solved by the first controller 311 and/or the second controller 321 to control the trailing vehicle 320 to follow the leading vehicle 310 at an intended separation are described in U.S. Provisional Patent Application No. 62/682,537, filed Jun. 8, 2018, the entirety of which is hereby incorporated by reference.

In at least one embodiment, more than two vehicles are included in a fleet of vehicles following each other on the path 330. In an example, a further trailing vehicle (not shown) follows the trailing vehicle 320. A third controller (not shown) associated with the further trailing vehicle is configured to receive the second driving profile 326 generated by the second controller 321, generate a third driving profile based on the received second driving profile 326, and control movement of the further trailing vehicle along the path 330 and following the trailing vehicle 320 based on the generated third driving profile, in a manner similar to the described operations of the second controller 321. In at least one embodiment, the leading vehicle 310 is catching up with a further leading vehicle (not shown) and becomes a trailing vehicle. In this situation, the first controller 311 receives a driving profile from the further leading vehicle and uses the received driving profile as a constraint in solving an optimization problem to update the first driving profile 316, in a manner similar to the described operations of the second controller 321. An example of this situation is met where the path 330 is a closed loop, and the leading vehicle 310 being a first vehicle of the fleet is catching up with a last vehicle and becomes a trailing vehicle. The controller on each vehicle in the fleet repeatedly updates its driving profile based on a driving profile received from the vehicle immediately ahead, and sends the updated driving profile to the vehicle immediately behind. As a result, the vehicles in the fleet follow each other at an intended separation in an optimal manner.

The above description includes examples, and other configurations are within the scopes of various embodiments.

For example, in some embodiments, the controller 110, 311 or 321 is configured to, at each control iteration, estimate a parameter of the vehicle, and use the estimated parameter in generating the travel plan for the vehicle over the remainder of the path. For example, instead of using a constant parameter retrieved from the vehicle configuration database 150, the parameter of the vehicle is constantly updated through estimation which further improves optimality of the optimization problem solution, i.e., the driving profile of the vehicle. In at least one embodiment, the parameter of the vehicle to be updated includes the mass or weight of the vehicle, which changes, for example, when passengers get on or off the vehicle. In another example, the parameter of the vehicle to be updated is a parameter that changes as the vehicle ages through normal wear-and-tear. Examples of parameter estimation techniques are described in U.S. Provisional Patent Application No. 62/682,537, filed Jun. 8, 2018, the entirety of which is hereby incorporated by reference.

In some situations, time delays are observed in operations of the motoring and braking system 120. For example, when the control vector is outputted by the controller 110 to the motoring and braking system 120 to drive the vehicle, there are time delays from when the control vector is received until the propulsion source, such as, a motor, or the brake generates the corresponding motoring or barking force corresponding to the control vector. The motoring time delay associated with the propulsion source and the braking time delay associated with the brake are similar in some situations, and different in other situations. One or more embodiments take such time delays into account to further improve optimality of the solution, i.e., the driving profile generated through optimization. Examples of embodiments that consider time delays of a motoring and braking system are described in U.S. Provisional Patent Application No. 62/682,537, filed Jun. 8, 2018, the entirety of which is hereby incorporated by reference. In the described example embodiments, at each control iteration, the controller determines, between the current position and the target location, a predicted position of the vehicle corresponding to at least one delay of the motoring and braking system. The controller next solves an optimization problem to determine a first part of the travel plan between the predicted position and the target location. The controller then determines, based on the first part of the travel plan, a second part of the travel plan between the current position and the predicted position, for example, through interpolation.

In some embodiments, to limit wear-and-tear on the braking system, hard braking is reserved for an emergency or a modelling error. For example, the constraints to be used for optimization comprises a first brake constraint and a second brake constraint. The second brake constraint corresponds to a harder brake operation (or force) than the first brake constraint. In at least one embodiment, the second brake constraint corresponds to the performance limit, e.g., the maximum braking force, of the braking system, whereas the first brake constraint corresponds to a softer braking operation (or force) to improve passenger comfort, stop the vehicle without overshoot in the event of a modelling error, or adjust to a new shorter stopping distance. The controller is configured to solve the optimization problem constrained by the first (soft) brake constraint. The objective function of the controller penalizes braking above the soft braking constraint/level. In response to a determination that the optimization problem constrained by the first brake constraint is feasible, the controller is configured to control the motoring and braking system of the vehicle based on the solution of the optimization problem. On the other hand, in response to a determination that the optimization problem constrained by the first brake constraint is infeasible (i.e., a modelling error exists and extra braking is required to satisfy the constraints of the optimization problem), the controller is configured to solve the optimization problem constrained by the second brake constraint corresponding to the harder brake operation. As discussed herein, in embodiments where the optimization problem is a convex second order cone problem, it is possible to determine if the control problem is infeasible (e.g., arrival time, speed limit, or stopping point are impossible to achieve) in a fraction of the time it takes to solve one control iteration, and therefore, it is possible to trigger the emergency brake thus saving valuable time and increasing the chances of a safe arrival.

In some embodiments, to optimize the control of a fleet of vehicles, only a one-way communication is needed from a leading vehicle to a trailing vehicle to drive the entire fleet optimally. In at least one embodiment, each vehicle is running at the optimal Automatic Speed Control (ASC), and transmitting its forecasted optimal control profile, e.g., a driving profile including at least one of position, speed, velocity, etc. . . . , for its entire remaining distance to the target location to its immediately following vehicle. The following vehicle adds the received driving profile into the constrain set for its controller for optimization at the following vehicle. Each following vehicle assumes that it is possible for the leading vehicle to come to an immediate stop at any point in its forecasted trajectory to account for any possible way in which the vehicle is to stop (normal stop, crash, etc. . . . ). In at least one embodiment, this allows to optimally control an entire fleet of vehicles with a basic control architecture and allows to move vehicles closer together, achieve higher passenger comfort, reduce more wear-and-tear on the vehicles and conserve significantly more energy than is possible with moving-block CBTC.

A practical application of some embodiments is CBTC systems configured to operate in ATO, driverless or unattended modes of operation where the VOBC commands the requested propulsion and braking effort along with coasting to the vehicle's control systems. A further practical application of some embodiments is for off-line generation of speed profiles to improve the capabilities of existing speed controllers. In at least one embodiment, the controller is used for larger scale control room routing and management of complete vehicle fleets or other mobile logistical planning. While trains are a practical application of some embodiments, at least one embodiment has a practical application in road vehicles, such as autonomous cars, travelling on a guideway, especially in the form of a fleet of vehicle one following another as described herein.

Compared to alternative approaches, one or more embodiments provide one or more advantages discussed herein. Specifically, an alternative approach involves ad-hoc techniques which are tuned to a specific vehicle. The underlying architecture is usually a PID (Proportional-Integral-Derivative) where a current present measurement set (speed, acceleration, position) is fed back into a controller which plans only its present control decision without factoring in the future consequences of its action. The PID attempts to track a per-defined speed profile. Thus, a present control decision may cause an over speed further down the line. Since a PID is a linear controller that is not designed for non-linear systems, it is usually patched with other ad-hoc techniques to work to an acceptable level in an advanced non-linear system. This patch-on-patch design model for a controller is neither sustainable nor robust. From the controller tuning point of view, it is difficult to tune a linear controller on a vehicle mainly due to the complex behavior and system interactions of the vehicle. Additionally, it is difficult to understand and debug control properties of such a linear controller. These factors make it difficult to ensure that a linear controller can cope under all possible conditions. The ad-hoc control strategies are not using optimization techniques and are difficult to design in a manner where the required constrains such as time-table adherence and energy consumption levels can be satisfied. Such controllers depend heavily on their tuning and are often additionally limited by the simplifications to the vehicle model which are required for their function. As control objectives and models become more complex, alternative control architectures become less able to keep up and eventually become completely unable to meet the vehicle control requirements.

To address one or more concerns observed in the ad-hoc techniques, a further alternative approach involves controllers based on optimal control. Such optimal controllers largely suffer from the inability to solve the control law fast enough to be usable as automatic speed controller. Therefore, due to the large numerical computation requirements for these controllers, they are utilized as offline planning algorithms for existing controllers, or as driver assist systems. For example, a driver assist system computes switching points between motoring/speed-hold/coast/brake states, and informs the driver when they should change modes. It takes a few seconds to re-optimize the switching curve profile whereas an ASC in ATO operation needs to operate at frequencies in the order of 10 Hz. The alternative approach also greatly simplifies the underlying vehicle and trip model and does not account for the possibility of running behind another vehicle. The alternative approach is not real-time capable and cannot drive a vehicle on its own but instead relies on the driver following the switching curves that is generates.

In contrast, one or more embodiments allow for real-time optimal and adaptive control of the vehicle to achieve goals defined by the operator while satisfying defined constraints in a driverless or unattended modes of operation. In at least one embodiment, the controller repeats optimization each and every control cycle in real-time and returns a solution substantially faster than 100 ms.

Since the type of controller in some embodiments is model based, it is possible to mathematically determine the most optimal course of action (e.g., driving profile) for the vehicle. In addition, at least one embodiment allows for hard constraints (including, but not limited to, speed limits, arrival time limits, control limits, etc. . . . ) to be numerically specified and mathematically guarantees that the control law will adhere to the hard constraints assuming that the constraints are feasible. Therefore, control objectives such as minimum time or constrained arrival time and energy optimal driving strategies are possible. These capabilities are not available in the described alternative approaches.

In some embodiments, the real-time capability to re-optimize the entire driving profile up to the target location, e.g., the next station, at every control iteration allows an energy and time minimized driving strategy. The controller in accordance with some embodiments does not need to be supplied with a speed curve and is therefore much easier to deploy in the field. In addition, it is robust (less sensitive) to changes in the trip requirements. For instance, if a vehicle running a PID controller must be delayed for any reason to a next platform the PID controller will bring the vehicle to a complete stop, wait the delay time, and then resume following its reference speed curve. This is greatly inefficient, uncomfortable to passengers, and detrimental to the railway operators reputation. One or more embodiments mitigate this by immediate re-optimizing the entire driving profile over the remainder of the intended travel and continued driving in the newly calculated (adaptive) most optimal manner.

The controller in some embodiments is a model-based controller which within itself knows the entire model of the vehicle it is controlling. Therefore, the controller plans the most efficient and safe courses of action, but is also easy to adapt to different vehicles. This removes the need for the ad-hoc patch-on-patch work-flow that is present with controllers in accordance with alternative approaches, and allows for a streamlined ease to configure and understand the controller in at least one embodiment.

The convexity of the optimization problem handled by a controller in at least one embodiment and/or the algorithmic design provide(s) the controller's capability of real-time operation. In contrast to optimal vehicle speed control methods in alternative approaches, the controller in at least one embodiment is fully capable of real-time operation on minimal hardware.

The controller in some embodiments also presents an inter-vehicle communication and optimization method allowing many vehicles to follow one close to another in an optimal manner, e.g., during high service hours. The controller in some embodiments allows for much smoother and more energy efficient driving than is currently possible with controllers in alternative approaches.

Some embodiments further provide one or more advantages including, but not limited to, huge energy savings and guaranteed timetable adherence along due to optimal constrained driving, greatly reduced tuning effort for deployment in the field, and self-tuning and internal optimization strategy permitting the controller to adapt to the vehicle and does not deteriorate in performance as the vehicle ages.

Figure 4:
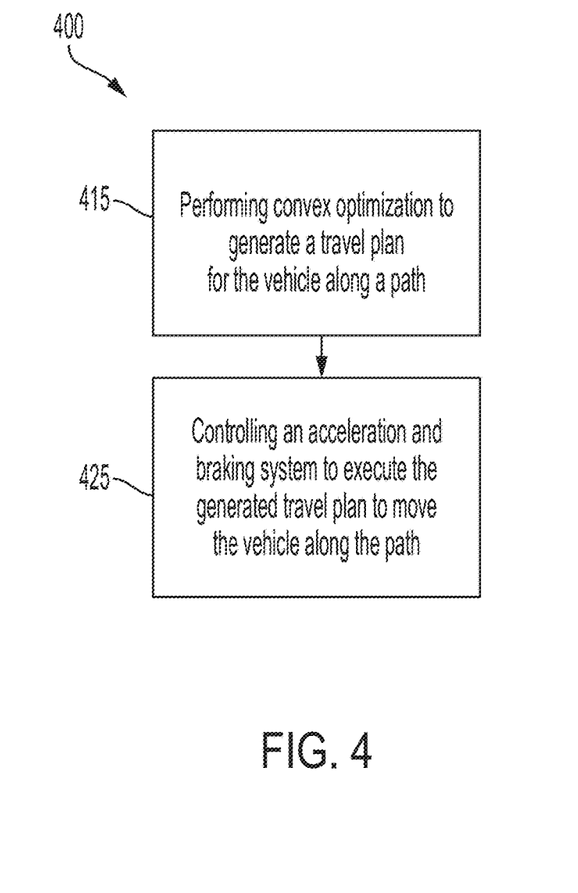
FIG. 4 is flow chart of a method, in accordance with one or more embodiments.

FIG. 4 is flow chart of a method 400, in accordance with one or more embodiments. In at least one embodiment, the method 400 is performed by one or more of the controller 110, first controller 311 and second controller 321.

At operation 415, a convex optimization is performed to generate a travel plan for the vehicle along a path. The convex optimization comprises a second order cone problem. For example, the controller 110 solves a convex optimization problem which is a second order cone problem, as described with respect to FIG. 1.

At operation 425, a motoring and braking system of the vehicle is controlled to execute the generated travel plan to move the vehicle along the path. For example, the motoring and braking system 120 is controlled to execute the travel plan generated by the controller 110 to move the vehicle along the path, as described with respect to FIG. 1.

Figure 5:
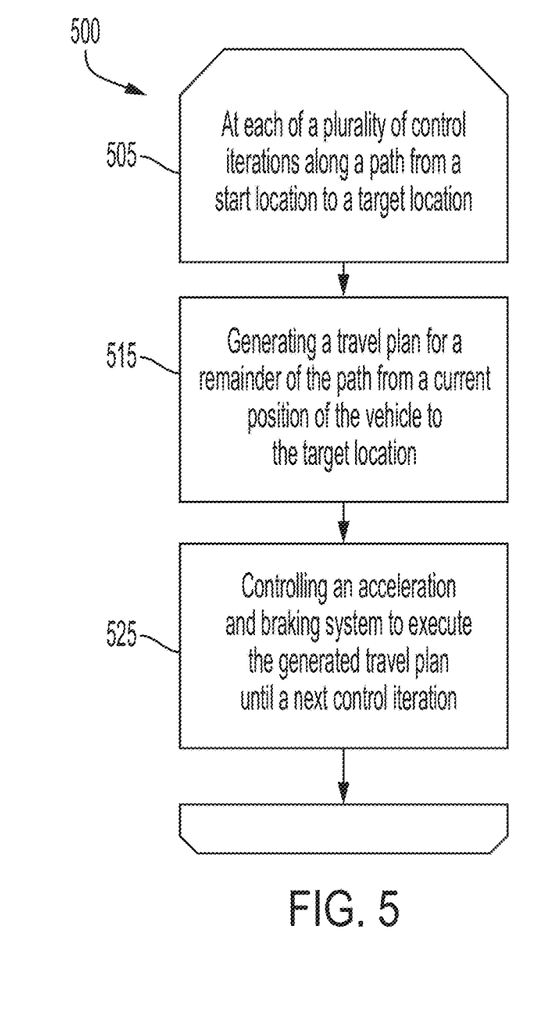
FIG. 5 is flow chart of a method, in accordance with one or more embodiments.

FIG. 5 is flow chart of a method 500, in accordance with one or more embodiments. In at least one embodiment, the method 500 is performed by one or more of the controller 110, first controller 311 and second controller 321.

As indicated at loop operation 505, the method 500 includes operations 515 and 525 which are repeatedly performed for each of a plurality of control iterations along a path from a start location to a target location. For example, the control iterations in the method 500 corresponding to the control iterations 210, 220, 230, . . . 250, which are performed at various locations X0, X1, X2, . . . XN along the path 202 from a start location 204 to a target location 206, as described with respect to FIG. 2.

At operation 515, a travel plan for a remainder of the path from a current position of the vehicle to the target location is generated. For example, at the control iteration 220, a travel plan for a remainder of the path 202 from a current position X1 of the vehicle to the target location 206 is generated, as described with respect to FIG. 2.

At operation 525, a motoring and braking system is controlled to execute the generated travel plan until a next control iteration. For example, the first element 227 of the travel plan at the discretization node 227 is applied by the controller 110 to control the motoring and braking system 120 to move the vehicle until the next control iteration 230 (or next discretization node 237) is reached. In at least one embodiment, the above-described operations are repeatedly performed until the vehicle reaches the target location 206, as described with respect to FIG. 2.

Figure 6:
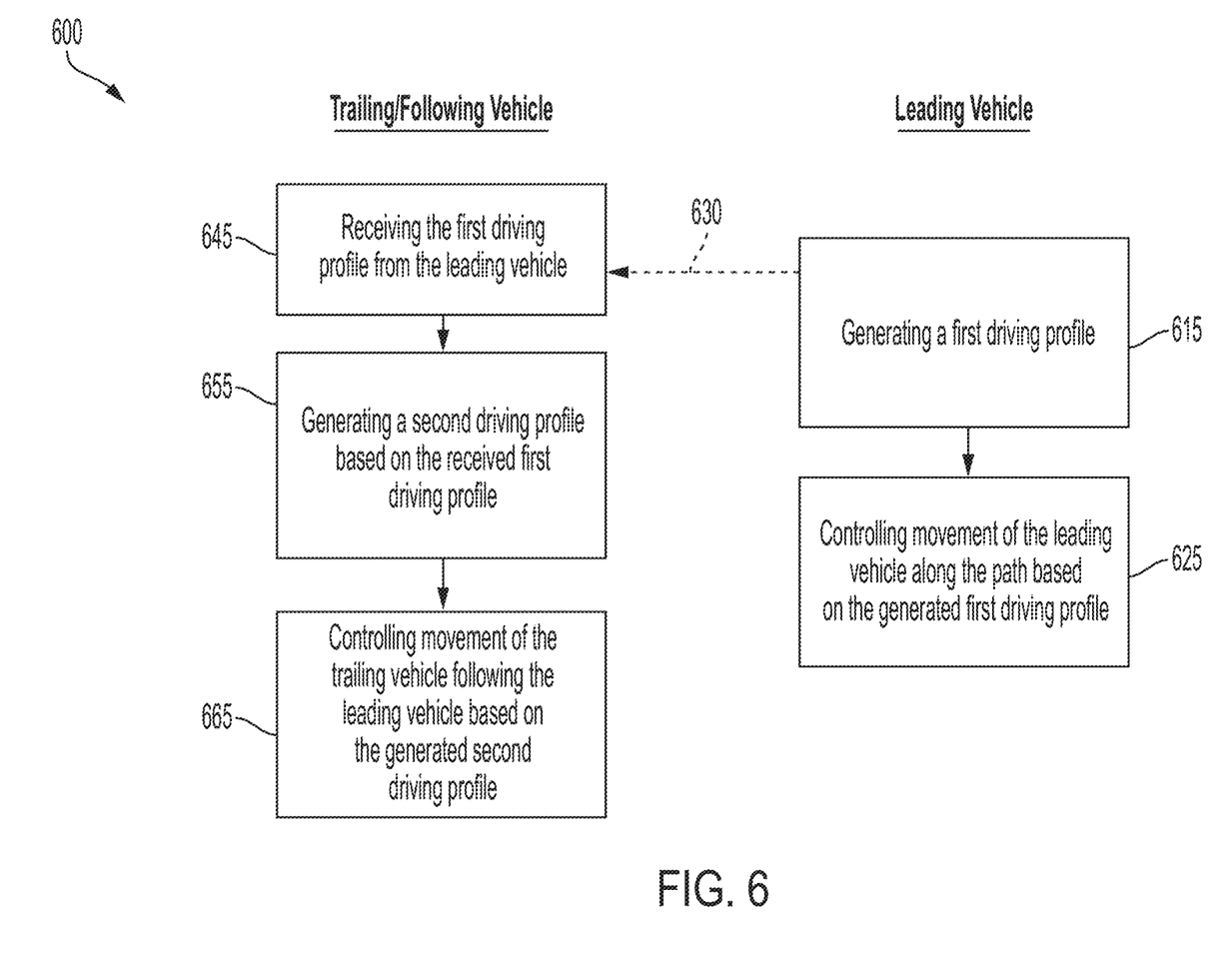
FIG. 6 is flow chart of a method, in accordance with one or more embodiments.

FIG. 6 is flow chart of a method 600, in accordance with one or more embodiments. In at least one embodiment, the method 600 is performed by the first controller 311 and second controller 321. The left-side part of the flow chart in FIG. 6 includes operations on a trailing vehicle, such as the trailing vehicle 320 in FIG. 3. The right-side part of the flow chart in FIG. 6 includes operations on a leading vehicle, such as the leading vehicle 310 in FIG. 3.

On the leading vehicle side, at operation 615, a first driving profile is generated for the leading vehicle. For example, the first controller 311 of the leading vehicle 310 generates a first driving profile 316 for the leading vehicle 310, as described with respect to FIG. 3. In at least one embodiment, the first driving profile 316 is generated by solving an optimization problem as described with respect to FIG. 1. In at least one embodiment, the first driving profile 316 is otherwise generated, without solving an optimization problem. The first driving profile 316 is transmitted to the trailing vehicle, as indicated at 630.

At operation 625, movement of the leading vehicle along the path is controlled based on the generated first driving profile. For example, the first controller 311 controls the motoring and braking system 312 of the leading vehicle 310 to move the leading vehicle 310 along the path, as described with respect to FIG. 3.

On the trailing vehicle side, at operation 645, the first driving profile generated by the first controller is received. For example, the second controller 321 of the trailing vehicle 320 receives the first driving profile 316 over a communication 340, as described with respect to FIG. 3.

At operation 655, a second driving profile is generated based on the received first driving profile. For example, the second controller 321 solves an optimization problem with the first driving profile 316 as a constraint, to obtain the second driving profile 326, as described with respect to FIG. 3.

At operation 665, movement of the trailing vehicle along the path and following the leading vehicle is controlled based on the generated second driving profile. For example, the second controller 321 controls the motoring and braking system 322 of the trailing vehicle 320 to move the trailing vehicle 320 along the path 330 and following the leading vehicle 310, as described with respect to FIG. 3.

Figure 7:
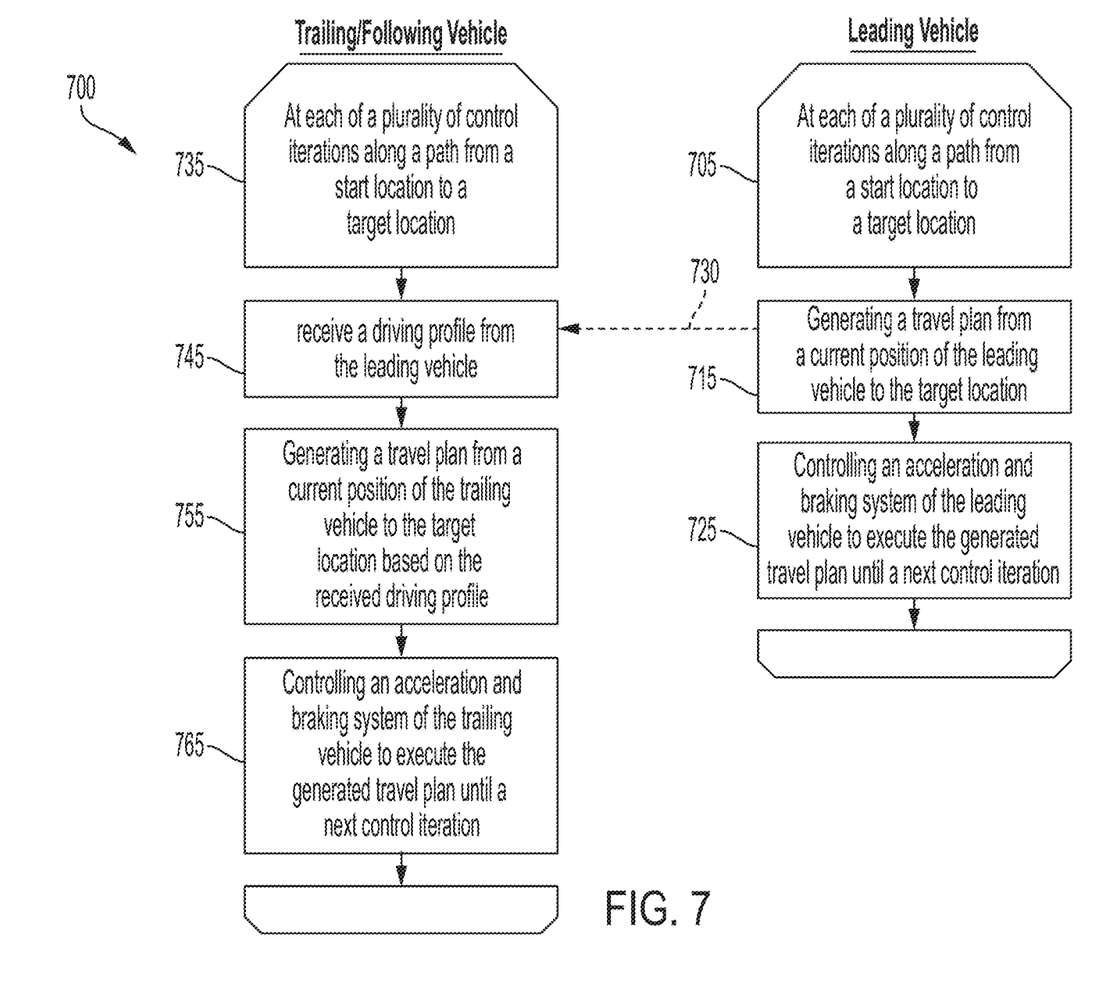
FIG. 7 is flow chart of a method, in accordance with one or more embodiments.

FIG. 7 is flow chart of a method 700, in accordance with one or more embodiments. In at least one embodiment, the method 700 is performed by the first controller 311 and second controller 321. The left-side part of the flow chart in FIG. 7 includes operations on a trailing vehicle, such as the trailing vehicle 320 in FIG. 3. The right-side part of the flow chart in FIG. 7 includes operations on a leading vehicle, such as the leading vehicle 310 in FIG. 3.

On the leading vehicle side, as indicated at loop operation 705, the method 700 includes operations 715 and 725 which are repeatedly performed for each of a plurality of control iterations along a path from a start location to a target location. Likewise, on the trailing vehicle side, as indicated at loop operation 735, the method 700 includes operations 745, 755 and 765 which are repeatedly performed for each of a plurality of control iterations along the path from the start location to the target location. In at least one embodiment, the control iterations of the leading vehicle corresponds in a one-to-one relationship to the control iterations of the trailing vehicle. Other configurations are within the scopes of various embodiments. In an example, the control iterations for at least one of the leading vehicle 310 or the trailing vehicle 320 in the method 700 corresponding to the control iterations 210, 220, 230, . . . 250, which are performed at various locations X0, X1, X2, . . . XN along the path 202 from a start location 204 to a target location 206, as described with respect to FIG. 2.

On the leading vehicle side, at operation 715, a travel plan for a remainder of the path from a current position of the leading vehicle 310 to the target location is generated by the first controller 311, in a manner similar to operation 515 of the method 500.

At operation 725, the motoring and braking system 312 of the leading vehicle 310 is controlled to execute the generated travel plan until a next control iteration, in a manner similar to operation 525 of the method 500.

As indicated at 730, a driving profile corresponding to the generated travel plan of the leading vehicle 310 is transmitted to the trailing vehicle 320.

On the trailing vehicle side, at operation 745, the driving profile is received from the first controller.

At operation 755, a travel plan for a remainder of the path from a current position of the trailing vehicle 320 to the target location is generated by the second controller 321, in a manner similar to operation 515 of the method 500, with the received driving profile as a constraint.

At operation 765, the motoring and braking system 322 of the trailing vehicle 320 is controlled to execute the generated travel plan until a next control iteration, in a manner similar to operation 525 of the method 500.

One or more advantages achievable in the system 100 and/or system 300 by one or more of the controller 110, first controller 311 and second controller 321 is/are also achievable in one or more of the methods 400, 500, 600 and 700.

The described methods include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

Figure 8:
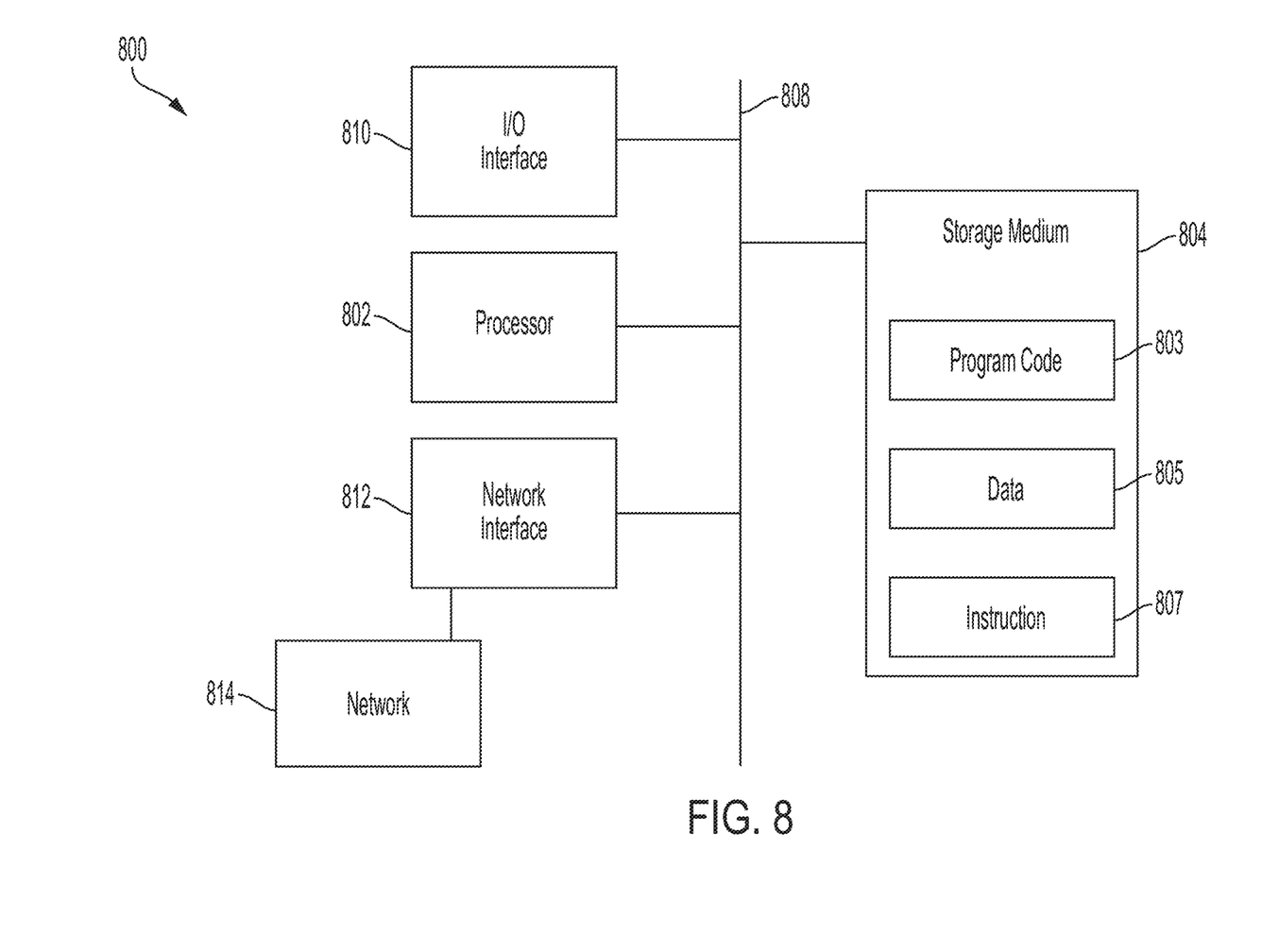
FIG. 8 is a block diagram of a computing platform, in accordance with one or more embodiments.

FIG. 8 is a block diagram of a computing platform 800, in accordance with one or more embodiments. In some embodiments, one or more of the controller 110, first controller 311, second controller 321, a VOBC of any one or more of the vehicle 100, leading vehicle 310 and trailing vehicle 320 is/are implemented as one or more computing platform(s) 800.

The computing platform 800 includes a specific-purpose hardware processor 802 and a non-transitory, computer readable storage medium 804 storing computer program code 803 and/or data 805. The computer readable storage medium 804 is also encoded with instructions 807 for interfacing with the vehicle on which the computing platform 800 is installed. The processor 802 is electrically coupled to the computer readable storage medium 804 via a bus 808. The processor 802 is also electrically coupled to an I/O interface 810 by the bus 808. A network interface 812 is electrically connected to the processor 802 via the bus 808. The network interface 812 is connected to a network 814, so that the processor 802 and/or the computer readable storage medium 804 is/are connectable to external elements and/or systems via the network 814.

In some embodiments, the processor 802 is a central processing unit (CPU), a multi-processor, a distributed processing system, an application specific integrated circuit (ASIC), and/or a suitable hardware processing unit.

In some embodiments, the processor 802 is configured to execute the computer program code 803 and/or access the data 805 stored in the computer readable storage medium 804 in order to cause the computing platform 800 to perform as one or more components of the system 100 and/or system 300, and/or to perform a portion or all of the operations as described in one or more of the methods 400, 500, 600 and 700. For example, the computer program code 803 includes one or more algorithm or model for causing the processor 802 to solve optimization problems or estimate a parameter of the vehicle. The computer readable storage medium 804 includes one or more of the trip limits and objectives database 130, track database 140 and vehicle configuration database 150 with at least one control objective and one or more constraints for the optimization problems and/or parameter estimation.

In some embodiments, the processor 802 is hard-wired (e.g., as an ASIC) to cause the computing platform 800 to perform as one or more components of the system 100 and/or system 300, and/or to perform a portion or all of the operations as described in one or more of the methods 400, 500, 600 and 700.

In some embodiments, the computer readable storage medium 804 is an electronic, magnetic, optical, electromagnetic, infrared, and/or a semiconductor system (or apparatus or device). For example, the computer readable storage medium 804 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 804 includes a compact disk-read only memory (CD-ROM), a compact disk-read/write (CD-R/W), and/or a digital video disc (DVD).

In some embodiments, the I/O interface 810 is coupled to external circuitry. In some embodiments, the I/O interface 810 includes a keyboard, keypad, mouse, trackball, trackpad, and/or cursor direction keys for communicating information and commands to processor 802. In at least one embodiment, the I/O interface 810 is coupled to a communication circuit for vehicle-to-vehicle communication as described with respect to FIG. 3.

In some embodiments, the network interface 812 allows the computing platform 800 to communicate with network 814, to which one or more other computing platforms are connected. The network interface 812 includes wireless network interfaces such as BLUETOOTH, WIFI, WIMAX, GPRS, or WCDMA; or wired network interface such as ETHERNET, USB, or IEEE-1394. In some embodiments, the method 300A and/or method 300B is/are implemented in two or more computing platforms 800, and various executable instructions and/or data are exchanged between different computing platforms 800 via the network 814.

By being configured to execute some or all of functionalities and/or operations described with respect to FIGS. 1-7, the computing platform 800 enables the realization of one or more advantages and/or effects described with respect to FIGS. 1-7.

In some embodiments, a controller for a vehicle comprises a processor configured to repeatedly perform operations, at each control iteration among a plurality of control iterations along a path of the vehicle from a start location to a target location, by solving an optimization problem. The operations include, based on a current state of the vehicle, generating a travel plan for a remainder of the path from a current position of the vehicle to the target location. The operations further include controlling a motoring and braking system of the vehicle to execute the generated travel plan until a next control iteration among the plurality of control iterations.

In some embodiments, a system for controlling a plurality of vehicles along a common path comprises a first controller associated with a leading vehicle among the plurality of vehicles, and a second controller associated with a trailing vehicle among the plurality of vehicles. The first controller is configured to generate a first driving profile, and control movement of the leading vehicle along the path based on the generated first driving profile. The second controller is configured to receive the first driving profile generated by the first controller, generate a second driving profile based on the received first driving profile, and control movement of the trailing vehicle along the path and following the leading vehicle based on the generated second driving profile.

In some embodiments, a method of controlling a vehicle comprises performing convex optimization to generate a travel plan for the vehicle along a path, and controlling a motoring and braking system of the vehicle to execute the generated travel plan to move the vehicle along the path. The convex optimization comprises a second order cone problem.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A controller for a vehicle, the controller comprising:
   a processor configured to repeatedly perform, at each control iteration among a plurality of control iterations along a path of the vehicle from a start location to a target location, operations including
     based on a current state of the vehicle, generating a travel plan for a remainder of the path from a current position of the vehicle to the target location, by solving an optimization problem, and
     controlling a motoring and braking system of the vehicle to execute the generated travel plan until a next control iteration among the plurality of control iterations, wherein the processor is further configured to solve the optimization problem based on the current state of the vehicle, at least one control objective, and at least one constraint,
   the at least one constraint comprises a first brake constraint and a second brake constraint, the second brake constraint corresponding to a harder brake operation than the first brake constraint,
   the processor is further configured to
     solve the optimization problem constrained by the first brake constraint,
     in response to a determination that the optimization problem constrained by the first brake constraint is feasible, control the motoring and braking system of the vehicle based on a solution of the optimization problem, and
     in response to a determination that the optimization problem constrained by the first brake constraint is infeasible, solve the optimization problem constrained by the second brake constraint corresponding to the harder brake operation.

2. The controller of claim 1, wherein the optimization problem includes a convex second order cone problem.

3. The controller of claim 1, wherein the processor is configured to change, in real-time while the vehicle is travelling on the path, one or more of
   the at least one control objective, and
   the at least one constraint.

4. The controller of claim 1, wherein the optimization problem includes a convex second order cone problem, and the processor is configured to determine whether the convex second order cone problem is feasible or not in a single control iteration.

5. The controller of claim 1, further comprising:
   a communication circuit configured to perform communication with a further controller of a trailing vehicle that follows the vehicle with the controller on the path from the start location to the target location,
   wherein the processor is further configured to repeatedly perform, at each control iteration among the plurality of control iterations along the path from the start location to the target location,
     causing the communication circuit to transmit a driving profile corresponding to the travel plan generated in said control iteration to the further controller of the trailing vehicle to be used by the further controller as a constraint in generating a further travel plan for the trailing vehicle.

6. The controller of claim 1, further comprising:
   a communication circuit configured to perform communication with a further controller of a leading vehicle that the vehicle with the controller follows on the path from the start location to the target location,
   wherein the processor is further configured to repeatedly perform, at each control iteration among the plurality of control iterations along the path from the start location to the target location,
     causing the communication circuit to receive, from the further controller, a further travel plan of the leading vehicle, and
     using the received further travel plan of the leading vehicle as a constraint in said generating the travel plan for the vehicle with the controller.

7. The controller of claim 1, wherein the processor is further configured to repeatedly perform, at each control iteration among the plurality of control iterations along the path from the start location to the target location,
   estimating a parameter of the vehicle, and
   using the estimated parameter in said generating the travel plan for the vehicle.

8. The controller of claim 1, wherein the processor is further configured to perform said generating the travel plan for the remainder of the path from the current position of the vehicle to the target location by
   determining, between the current position and the target location, a predicted position of the vehicle corresponding to a delay of the motoring and braking system,
   solving the optimization problem to determine a first part of the travel plan between the predicted position and the target location, and determining, based on the first part of the travel plan, a second part of the travel plan between the current position and the predicted position.

9. A system for controlling a plurality of vehicles along a common path, the system comprising:
a first controller associated with a leading vehicle among the plurality of vehicles, the first controller configured to
generate a first driving profile, and
control movement of the leading vehicle along the path based on the generated first driving profile; and
a second controller associated with a trailing vehicle among the plurality of vehicles, the second controller configured to
receive the first driving profile generated by the first controller,
generate a second driving profile based on the received first driving profile, and
control movement of the trailing vehicle along the path and following the leading vehicle based on the generated second driving profile,
wherein each of the first and second controllers is configured to repeatedly perform, at each control iteration among a plurality of control iterations along the path from a start location to a target location, operations including
based on a current state of the corresponding leading or trailing vehicle, generating a travel plan for the corresponding leading or trailing vehicle on a remainder of the path from a current position of the corresponding leading or trailing vehicle to the target location, and
controlling a motoring and braking system of the corresponding leading or trailing vehicle to execute the generated travel plan until a next control iteration among the plurality of control iterations, and
wherein said generating the travel plan for the corresponding leading or trailing vehicle for the remainder of the path from the current position of the leading or trailing vehicle to the target location includes:
determining, between the current position of the leading or trailing vehicle and the target location, a predicted position of the leading or trailing vehicle corresponding to a delay of the motoring and braking system,
solving an optimization problem, by the first or second controller, to determine a first part of the travel plan between the predicted position and the target location, and
determining, based on the first part of the travel plan, a second part of the travel plan between the current position and the predicted position.

10. The system of claim 9, wherein
the first and second controllers further comprise first and second communication circuits, respectively, configured to perform one-way communication with each other to transmit the first driving profile from the first controller to the second controller.

11. The system of claim 9, wherein
the second controller is further configured to perform said generating the travel plan for the trailing vehicle based on the first driving profile received from the first controller, the first and second driving profiles corresponding to the travel plans generated by the first and second controllers, respectively, for the leading vehicle and the trailing vehicle, respectively.

12. The system of claim 9, wherein
the second controller is configured to generate the second driving profile by solving the optimization problem using the received first driving profile as a constraint.

13. The system of claim 12, wherein
the first controller is configured to generate the first driving profile by solving the optimization problem, and
the optimization problem solved by the second controller and the optimization problem solved by the first controller have at least one common control objective.

14. The system of claim 12, wherein
the first controller is configured to generate the first driving profile by solving the optimization problem, and
the optimization problem solved by the second controller and the optimization problem solved by the first controller have different control objectives.

15. The system of claim 9, further comprising:
a third controller associated with a further trailing vehicle among the plurality of vehicles, the further trailing vehicle following the trailing vehicle,
wherein the third controller is configured to
receive the second driving profile generated by the second controller,
generate a third driving profile based on the received second driving profile, and
control movement of the further trailing vehicle along the path and following the trailing vehicle based on the generated third driving profile.

16. The system of claim 9, wherein
solving the optimization problem with respect to the leading or trailing vehicle is performed based on the current state of the leading or trailing vehicle, at least one control objective, and at least one constraint,
the at least one constraint comprises a first brake constraint and a second brake constraint of the leading or trailing vehicle, the second brake constraint corresponding to a harder brake operation than the first brake constraint,
the system further configured to:
solve the optimization problem constrained by the first brake constraint,
in response to a determination that the optimization problem constrained by the first brake constraint is feasible, control the motoring and braking system of the leading or trailing vehicle based on a solution of the optimization problem, and
in response to a determination that the optimization problem constrained by the first brake constraint is infeasible, solve the optimization problem constrained by the second brake constraint corresponding to the harder brake operation.

17. A method of controlling a vehicle, the method comprising:
repeatedly performing, at each control iteration among a plurality of control iterations along a path of the vehicle from a start location to a target location, operations including
based on a current state of the vehicle, generating a travel plan for a remainder of the path from a current position of the vehicle to the target location, by performing convex optimization, and
controlling a motoring and braking system of the vehicle to execute the generated travel plan to move the vehicle along the path,
wherein the convex optimization comprises a second order cone problem and wherein the method performs said generating the travel plan for the remainder of the path from the current position of the vehicle to the target location by determining, between the current position and the target location, a predicted position of the vehicle corresponding to a delay of the motoring and braking system, solving the optimization problem to determine a first part of the travel plan between the predicted position and the target location, and determining, based on the first part of the travel plan, a second part of the travel plan between the current position and the predicted position.

18. The method of claim 17, wherein the plurality of control iterations corresponds to a plurality of discretization nodes on the path between the start location and the target location, and said repeatedly performing comprises, at each discretization node among the plurality of discretization nodes, performing the convex optimization, based on the current state of the vehicle, to generate a control vector including control elements corresponding to discretization nodes remaining on the path from the current position of the vehicle to the target location, and controlling the motoring and braking system of the vehicle to execute a first control element among the control elements of the generated control vector to move the vehicle to a next discretization node among the discretization nodes remaining on the path.

19. The method of claim 18, wherein said defining comprises distributing the plurality of discretization nodes at a predetermined distance from each other, or at a predetermined time interval from each other.

20. The method of claim 17, wherein solving the optimization problem is performed based on the current state of the vehicle, at least one control objective, and at least one constraint, the at least one constraint comprises a first brake constraint and a second brake constraint, the second brake constraint corresponding to a harder brake operation than the first brake constraint, the method further comprises:

solving the optimization problem constrained by the first brake constraint, in response to a determination that the optimization problem constrained by the first brake constraint is feasible, controlling the motoring and braking system of the vehicle based on a solution of the optimization problem, and in response to a determination that the optimization problem constrained by the first brake constraint is infeasible, solving the optimization problem constrained by the second brake constraint corresponding to the harder brake operation.

* * * * *